United States Patent
Geisen

(10) Patent No.: US 11,186,043 B2
(45) Date of Patent: Nov. 30, 2021

(54) METHOD FOR DETERMINING THE POSITION OF A CONSTRUCTION PLATFORM FOR ADDITIVE MANUFACTURING OF A COMPONENT

(71) Applicant: Siemens Energy Global GmbH & Co. KG, Munich (DE)

(72) Inventor: Ole Geisen, Berlin (DE)

(73) Assignee: Siemens Energy Global GmbH & Co KG, Munich (DE)

( * ) Notice: Subject to any disclaimer, the term of this patent is extended or adjusted under 35 U.S.C. 154(b) by 79 days.

(21) Appl. No.: 16/344,429

(22) PCT Filed: Nov. 8, 2017

(86) PCT No.: PCT/EP2017/078585
§ 371 (c)(1),
(2) Date: Apr. 24, 2019

(87) PCT Pub. No.: WO2018/087137
PCT Pub. Date: May 17, 2018

(65) Prior Publication Data
US 2020/0055254 A1    Feb. 20, 2020

(30) Foreign Application Priority Data

Nov. 11, 2016    (DE) ................... 10 2016 222 210.4

(51) Int. Cl.
*B29C 64/393*    (2017.01)
*B33Y 10/00*    (2015.01)
(Continued)

(52) U.S. Cl.
CPC .......... *B29C 64/393* (2017.08); *B29C 64/245* (2017.08); *B33Y 10/00* (2014.12); *B33Y 50/02* (2014.12)

(58) Field of Classification Search
None
See application file for complete search history.

(56) References Cited

U.S. PATENT DOCUMENTS 6,203,861 B1    3/2001    Kar et al.
6,483,596 B1    11/2002    Philippi et al.
(Continued)

FOREIGN PATENT DOCUMENTS

CN    105716655 A    6/2016
DE    102011052602 A1    11/2012
(Continued)

OTHER PUBLICATIONS

PCT International Search Report and Written opinion of International Searching Authority dated Feb. 8, 2018 corresponding to PCT International Application No. PCT/EP2017/078585 filed Nov. 8, 2017.

Primary Examiner — Mark A Osele
Assistant Examiner — Evan T Hulting

(57) ABSTRACT

A method for determining the position of a construction platform for additive manufacturing of a component, includes marking a construction platform for additive manufacturing, providing a marking region of the construction platform with reference features, wherein the reference features are arranged and designed in such a way that a position of the reference features relative to a reference point are captured using an optical scanning method, and optically scanning the construction platform in the marking region and capturing the relative position with the aid of the reference features and the reference point.

13 Claims, 2 Drawing Sheets

(51) Int. Cl.
*B33Y 50/02* (2015.01)
*B29C 64/245* (2017.01)

(56) References Cited

U.S. PATENT DOCUMENTS

| | | |
|---|---|---|
| 2007/0252309 A1 | 11/2007 | Higashi et al. |
| 2013/0199013 A1 | 8/2013 | Graichen |
| 2013/0268226 A1* | 10/2013 | Morfino ................ B25J 9/1692 702/94 |
| 2014/0263674 A1* | 9/2014 | Cerveny .......... G06K 19/06037 235/494 |
| 2015/0290878 A1 | 10/2015 | Houben et al. |
| 2017/0001258 A1 | 1/2017 | Hildebrand et al. |
| 2020/0055254 A1 | 2/2020 | Geisen |

FOREIGN PATENT DOCUMENTS

| | | |
|---|---|---|
| EP | 2727709 A1 | 5/2014 |
| EP | 2601006 B1 | 6/2014 |
| WO | 2015163765 A1 | 10/2015 |
| WO | 2018087137 A1 | 5/2018 |

* cited by examiner

METHOD FOR DETERMINING THE POSITION OF A CONSTRUCTION PLATFORM FOR ADDITIVE MANUFACTURING OF A COMPONENT

CROSS REFERENCE TO RELATED APPLICATIONS

This application is the U.S. National Stage of International Application No. PCT/EP2017/078585 filed Nov. 8, 2017, and claims the benefit thereof. The International Application claims the benefit of German Application No. DE 10 2016 222 210.4 filed Nov. 11, 2016. All of the applications are incorporated by reference herein in their entirety.

FIELD OF INVENTION

The present invention relates to a method for determining the position of a construction platform for additive manufacturing of a component.

BACKGROUND OF INVENTION

Generative or additive manufacturing methods comprise, for example, selective laser melting (SLM) or laser sintering (SLS) or electron beam melting (EBM) as powder bed methods. Laser melting deposition (LMD) likewise belongs to the additive methods.

A method for selective laser melting is known for example from EP 2 601 006 B1.

Additive production methods (additive manufacturing) have proven particularly advantageous for complex or complicated components or components in a filigree design, for example labyrinth-like structures, cooling structures and/or lightweight structures. In particular, additive production via a particularly short chain of process steps is advantageous since a manufacturing or production step of a component can take place directly based on a corresponding CAD file.

Furthermore, additive production is particularly advantageous for developing or manufacturing prototypes which, for example for financial reasons, cannot be manufactured, or manufactured efficiently, using conventional subtractive or cutting methods or casting technology.

With the increase in the industrial importance of additive production methods, there has also been an increasing need to develop method steps associated therewith, i.e. in particular preparatory method steps and/or follow-up measures, which contribute to enabling a construction or manufacturing outcome to be reproduced and reliably analyzed.

To this end, during or in conjunction with additive manufacturing of an individual component, for example a complex turbine part, such as a turbine blade which can be cooled from the inside, it is in particular necessary to monitor and to document the construction process with regard to a multiplicity of parameters. The said parameters or information relate not only to the direct method parameters, e.g. physical variables such as the laser output or the scanning speed, but also, for example, to information relating to the starting material (starting powder), or the state or alignment of a construction platform. Monitoring and registering the said parameters is all the more important since particularly high requirements are made of the described components with regard to production tolerances and also the microstructure.

To gain an overview of the complex parameter space in additive production and, in particular, to make the additive production process of a metal component, in particular a component which can be subject to high temperatures, (more) reproducible, it is necessary to document and to monitor, in particular, the state and/or position of a construction platform holistically.

SUMMARY OF INVENTION

It is therefore an object of the present invention to specify means which offer a solution to the said problem.

This object is achieved by the subject matter of the independent claim. Advantageous configurations are the subject matter of the dependent claims.

One aspect of the present invention relates to a method for determining the position of a construction platform for additive manufacturing of a component, comprising marking a construction platform or another arrangement part for additive manufacturing, comprising providing a marking region or reference region of the construction platform with at least one reference feature, advantageously a plurality of reference features wherein the (respective) reference feature is arranged and designed in such a way that a position of the reference feature and/or the marking region can be captured or calibrated relative to a reference, for example a reference system having at least one further reference point, using an optical scanning method, in particular laser scanning.

In the present case, the said position can relate both to the absolute position of a region of the construction platform in space, for example, and to an orientation or alignment of the construction platform. Assuming that the reference itself is applied to the platform, knowledge of the relative position of the (respective) reference feature in the marking region as a reference enables even a deformation state of the platform to be registered.

The method furthermore comprises optically scanning the construction platform in the marking region and capturing the relative position with the aid of the reference features and the reference or a reference point or corresponding position information.

In particular, both during and after additive manufacturing, a stress or deformation state of the construction platform can be captured and documented (in situ). Thus, in particular, the hitherto still partially inadequate process reproducibility in powder-bed based additive production can be decisively improved.

In one configuration, the method comprises providing the marking region with only a single reference feature.

In one configuration, the construction platform is provided with a plurality of reference features for each marking region. This configuration advantageously facilitates the capturing of the relative position.

In one configuration, the reference features are designed in a similar manner, in particular with the same dimensions. This configuration likewise advantageously facilitates the capturing of the relative position via optical methods.

In one configuration, the reference features are designed in a similar manner, in particular with the same dimensions, measurements or diameters. This configuration simplifies the optical scanning and registering of the reference points in order to capture their relative position for example using optical scanning methods.

In one configuration, the marking region is provided with the reference feature via mechanical processing.

In one configuration, the construction platform is provided with the reference features by means of a high-precision drilling or milling tool, for example a multi-axis CNC milling machine.

In conjunction with one of these configurations, forming the reference features as points is furthermore particularly expedient. In other words, the reference features are milled or drilled into the construction platform in the form of recesses or holes using the said means. This configuration enables, in particular, simple and reliable detectability of the position or location of the reference features. Moreover, the construction platform can thus be provided with the reference features in a particularly lasting manner.

In one configuration, the reference is produced or provided by a (reference) device which is separate from the construction platform and which can be installed in or on an arrangement for additive manufacturing of the component. This device can likewise be provided with reference features and can be optically scanned within the framework of the described method.

In one configuration, the relative position enables information relating to the alignment of the construction platform in space, for example in a manufacturing space for additive manufacturing.

For example, in this respect, part of an additive manufacturing arrangement can serve as a reference or reference point. This configuration makes it possible in the first place to establish the absolute location of position of the construction platform in space. The said relative position can be detected with appropriate precision depending on the spacing of the reference features from the reference.

In one configuration, the reference is produced or provided by a (marking) region of the construction platform which is spaced from the marking region and is likewise provided with at least one reference feature and is optically scanned. According to this configuration, the position of the reference feature—relative to a reference feature of the spaced (marking) region of the construction platform—indicates a stress state of the platform, since the corresponding stress or deformation brings about a change in the spacing of the relevant reference features.

In one configuration, the relative position enables information relating to the stress and/or deformation state of the construction platform.

In one configuration, the relative position enables information relating to the alignment of the construction platform in space. This configuration advantageously enables a precise initial alignment of the construction platform before the actual construction process and calibration of the construction platform relative to an exposure unit for the construction process, for example an exposure unit of the corresponding manufacturing arrangement.

In one configuration, the method comprises optically scanning the construction platform to capture the relative position during the additive manufacturing or the additive construction of the component (to be manufactured on the construction platform). As a result of this configuration, in particular a stress state during additive manufacturing can be monitored by optically scanning the position of the reference features.

In one configuration, the method comprises optically scanning the construction platform to capture the relative position after heat-treatment of the component constructed on the construction platform. As a result of this configuration, in particular a corresponding stress state of the construction platform can be captured via optical scanning and compared, for example, to a previously detected stress state during another method stage.

In one configuration, the method comprises optically scanning the construction platform to capture the relative position after the removal of the additively constructed or manufactured component from the construction platform. As a result of this configuration, quality control can likewise be enabled which captures the state of the construction platform even after the manufacturing of the component as described.

In one configuration, the method comprises comparing an outcome of the optical scanning of the construction platform, for example with regard to the stress and/or deformation state, to a starting state of the construction platform. The starting state advantageously refers to a state of the construction platform under standard pressure and temperature conditions, for example at room temperature before an additive manufacturing process.

In one configuration, the method comprises providing the construction platform with a code, for example a bar code and/or QR code. Accordingly, as a result of this additional method step, the construction platform can furthermore be indexed and registered so it can still be reliably associated with a previously manufactured component after a construction process. In this case, the advantages known to be offered by a QR code can be used for registering the construction platform.

In one configuration, the optical scanning method is a laser scanning method, for example comprising hardware for structured-light scanning of the construction platform, software for 3D form and measurement analysis and/or 3D analysis of computer-based data.

A further aspect of the present invention relates to an arrangement for additive manufacturing of the component, comprising a device which is designed to carry out the described method.

Features, configurations and advantages which are described in the present case with reference to the method can likewise relate accordingly to the device, and vice versa.

BRIEF DESCRIPTION OF THE DRAWINGS

Further details of the invention are described below with reference to the figures.

DETAILED DESCRIPTION OF INVENTION

In the exemplary embodiments and figures, similar or similarly acting elements can each be provided with the same reference signs. The illustrated elements and their mutual size ratios should essentially not be seen as being true to scale; rather, individual elements may be illustrated with dimensions which are excessively thick or large for better visualization and/or for better understanding.

Figure 1:
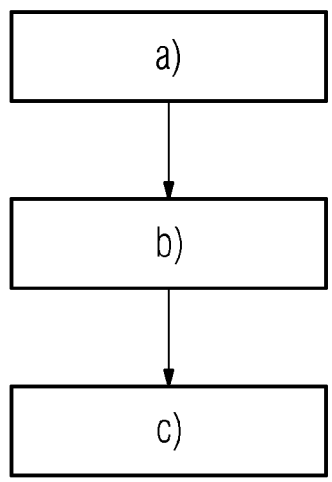
FIG. 1 shows a schematic flow chart, which indicates method steps of the method according to the invention.
Figure 2:
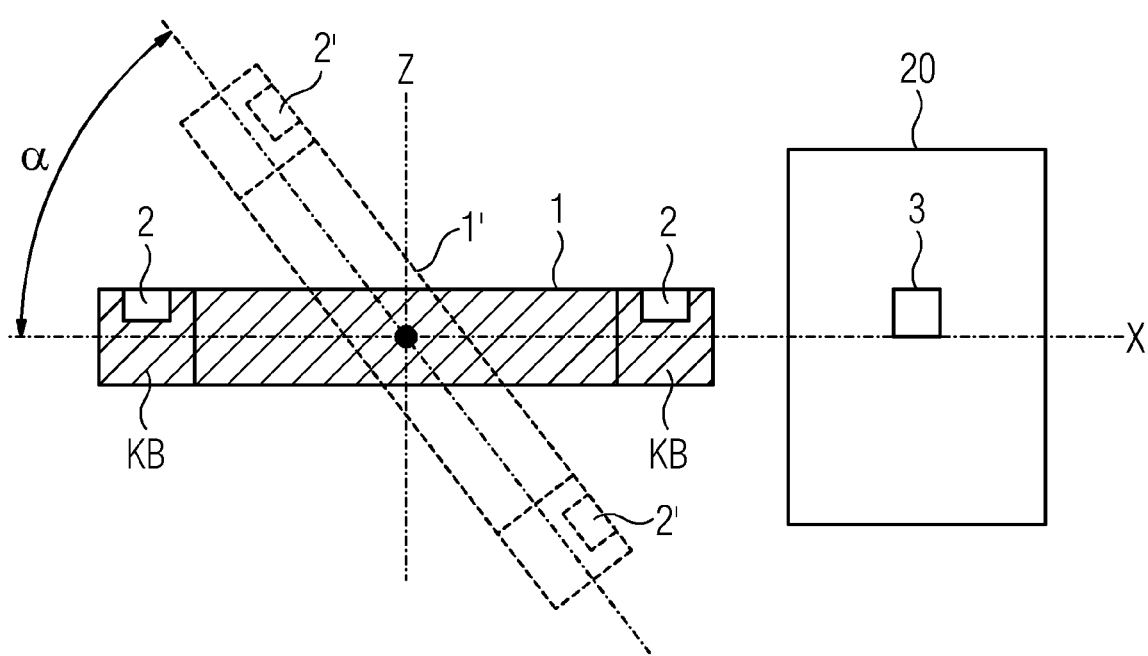
FIG. 2 shows a schematic sectional view of a construction platform with reference features according to the invention.

With the method step a) according to the described method, FIG. 1 indicates the marking of a construction platform 1 (c.f. FIG. 2) for additive manufacturing, comprising providing a marking region of the construction platform with reference features.

Figure 4:
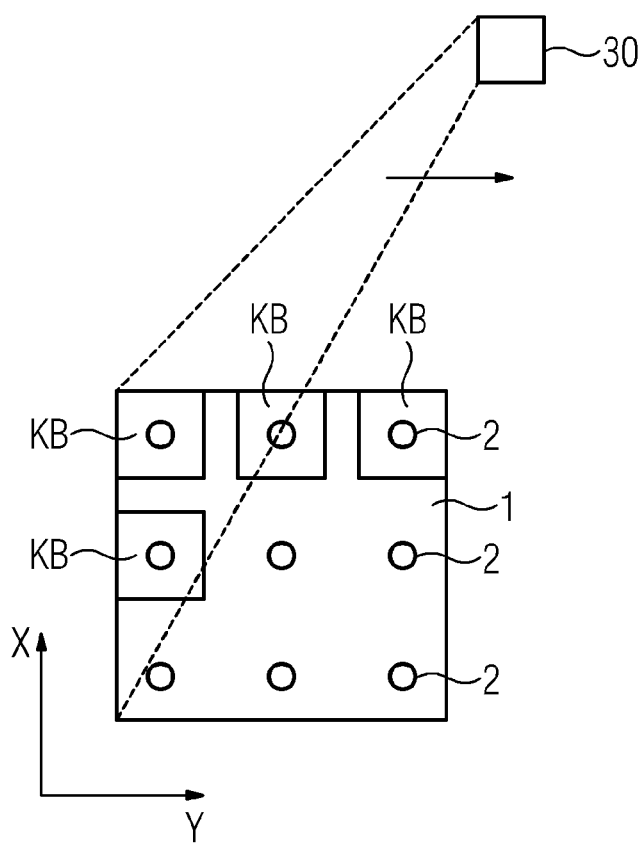
FIG. 4 shows a schematic plan view of a construction platform which is scanned using a scanning device.

The method step b) indicated in FIG. 1 indicates the optical scanning of the construction platform in the marking region (c.f. FIG. 4).

The method step c) indicated in FIG. 1 indicates the capturing of a position of the reference features relative to a reference.

The method according to the invention is described in detail with reference to FIGS. 2 to 4.

FIG. 2 shows a schematic sectional view of a construction platform 1. To simplify the illustration of the method steps, the construction platform 1 is plotted in a Cartesian coordinate system comprising the spatial axes X and Z. In this case, a center point of the construction platform 1 is plotted at the origin of the coordinate system (0,0).

The construction platform 1 has been provided with a respective reference feature 2 on horizontal sides (see above). The said reference features are advantageously milled into the structure of the construction platform 1 using a precision milling machine to enable a state or a position of the construction platform 1 to be captured in a lasting manner. The reference features can alternatively also be drilled. The milling of the reference features in particular reference points, can be carried out in particular by a high-precision tool to also enable the relative position to be captured particularly precisely.

In particular, the milling of the reference features 2, 2' is comparable to the reference methods used in so-called "GOM" systems.

In particular, the reference features have each been applied in a marking region KB of the component. The marking region KB can denote, for example, characteristic regions of the construction platform in which it is particularly expedient to apply the reference features, for example, to capture the position thereof or the topography of the marking region.

Within the framework of the described optical scanning or capturing of the relative position, it can be sufficient if, instead of the entire surface of the construction platform 1, only the (smaller) marking region KB is optically scanned (c.f. FIG. 3).

Furthermore, in FIG. 2, in an extension of the X axis, a device 20 is depicted, which has a reference point 3. Accordingly, the device can form a reference system, with the aid of which the position, orientation and/or deformation state of the respective component or the platform can be determined using the capturing procedure described.

The reference point 3 itself does not have to be optically scanned separately, but its position and location in space is advantageously established. The device 20 can be a device of an additive manufacturing arrangement (not denoted explicitly in the present case), for example a point or a vector, which can be determined with sufficient precision.

In FIG. 2, dashed lines indicate an alignment of the construction platform in space which is angled or set an angle α relative to the illustration of the construction platform 1 in solid lines, i.e. relative to the reference point 3.

The reference features 2 can be used in particular for aligning or orienting the construction platform 1. The reference features 2 according to the present invention are advantageously utilized for so-called leveling, i.e., horizontal alignment of the construction platform, which has to be carried out manually in conventional additive manufacturing methods.

The reference features 2 can also be used to align a radiation unit or an exposure unit, advantageously preferably a laser or electron beam (not illustrated explicitly in the figures in the present case) or a corresponding unit relative to the construction platform 1 in the described XY plane. This can take place in such a way that the actual, (optically) scanned geometry of the reference features 2 matches the information which is read into a control unit of the exposure device (not denoted explicitly in the present case), for example, and the exposure can be carried out reliably and reproducibly.

Alternatively or in addition to the reference features 3 which are applied, for example, using a milling machine or another processing tool, a bar code and/or a QR code or another reference feature can be incorporated in the platform.

Within the framework of the present method, the correspondingly captured relative position of the construction platform, for example comprising XYZ coordinates and/or an angle of a longitudinal axis of the construction platform (c.f. angle α as described above) can likewise be stored and/or relayed to a machine control unit, for example.

Figure 3:
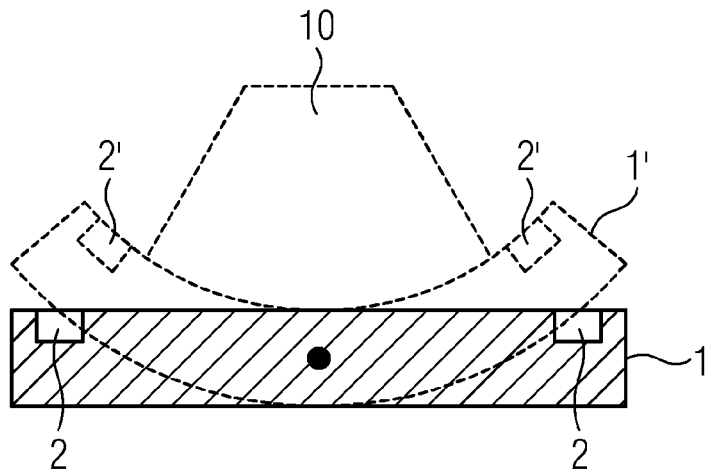
FIG. 3 shows, in each case, a schematic sectional view of a construction platform in different states with reference features according to the invention.

FIG. 3 shows a configuration of the method according to the invention, wherein a stress state of the construction platform 1 can be captured and controlled by the described method. Such stresses can occur in particular during laser or electron beam melting, where the focused energy beam produces high temperature gradients and therefore mechanical, thermal and/or thermodynamic stresses or loads in the material. These stresses result in deformations, as indicated by the dashed contour of a curved construction platform (c.f. reference sign 1').

The reference features of the stressed construction platform 1' are denoted analogously to the illustration of FIG. 2 by the reference sign 2'. On the basis of the captured relative position of the different reference features 2' on both sides of the cross-sectional illustration of FIG. 3, it is possible to draw conclusions relating to the stress state of the construction platform 1' via the described method (c.f. above).

The method as described in FIG. 3 can be carried out, for example, during additive manufacturing, i.e. after or between the consolidation of individual layers, after a corresponding stress-relaxing heat-treatment and/or after the separation or removal of a component constructed on the construction platform 1 (c.f. dashed lines and reference sign 10 in FIG. 3).

In particular, the method can additionally comprise comparing an outcome of the optical scanning of the construction platform, for example with regard to the stress and/or deformation state, during additive manufacturing, after a heat-treatment or after the removal of the component 10 (from the construction platform 1) to a starting state of the construction platform 1.

The component is advantageously provided for use in a continuous-flow machine, advantageously in the hot gas path of a gas turbine. The component is advantageously made from a nickel-base or super alloy, in particular a nickel- or cobalt-based super alloy. The alloy can be precipitation-hardened or precipitation-hardenable.

FIG. 4 shows a schematic plan view of a manufacturing surface of the construction platform 1, the XY surface. It can be seen that a plurality of reference features 2 are arranged in corresponding marking regions surrounding them. The reference features are, in particular, designed to be similar, with the same dimensions or diameters. The construction platform 1 is provided with a reference feature 2 for each marking region KB. Alternatively to this, the construction platform 1 can be provided with a plurality of reference features 2 for each marking region KB. As a result of the multiplicity of reference features (c.f. nine evenly arranged reference features in FIG. 4), the state or the position of the platform can be determined particularly precisely.

An optical scanning device 30 is furthermore shown in FIG. 4, for example comprising a structured-light scanner with which the relative position of each individual reference feature can be quickly and reliably captured. As described above, this can take place with the aid of a reference point 3, which is not shown here.

The scanning method as shown in FIG. 3 can be carried out, for example, before the start of a manufacturing process (c.f. FIG. 4) in order to establish or to register the starting state of the construction platform 1.

The described method can, of course, also be applied to components or structures other than a construction platform.

The description based on the exemplary embodiments does not restrict the invention thereto; rather, the invention comprises each novel feature and each combination of features. This includes, in particular, each combination of features in the claims, even if this feature or this combination is itself not explicitly indicated in the claims or exemplary embodiments.

The invention claimed is:

1. A method for determining a position of a construction platform for additive manufacturing of a component comprising:
   marking a construction platform for additive manufacturing, comprising providing a marking region of the construction platform with at least one reference feature via mechanical processing, wherein the at least one reference feature is arranged and designed in such a way that a relative position of the at least one reference feature relative to a reference point is capturable using an optical scanning method, wherein the reference point is provided by a device which is separate from the construction platform and which is installed on or in an arrangement for additive manufacturing of a component, and wherein the relative position enables information relating to alignment of the construction platform in space,
   optically scanning the construction platform in the marking region;
   capturing the relative position with the aid of the reference feature and the reference point;
   aligning the construction platform to a position relative to the reference point,
   wherein the mechanical processing is accomplished by milling or drilling the reference feature into the construction platform.

2. The method as claimed in claim 1, wherein the construction platform is provided with the reference features by a highprecision milling tool or a multi-axis CNC milling machine.

3. The method as claimed in claim 1, wherein the construction platform is provided with a plurality of reference features for each marking region, said plurality of reference features are designed in a similar manner or with the same dimensions.

4. The method as claimed in claim 1, wherein the reference point is provided by a region of the construction platform which is spaced from the marking region and which is likewise provided with reference features and is optically scanned, and wherein the relative position enables information relating to the alignment of the construction platform in space.

5. The method as claimed in claim 1,
   wherein the reference point is provided by a region of the construction platform which is spaced from the marking region and which is likewise provided with at least one reference feature and is optically scanned, and wherein the relative position enables information relating to a stress and/or a deformation state of the construction platform.

6. The method as claimed in claim 5, further comprising:
   optically scanning the construction platform to capture the relative position during an additive construction of the component.

7. The method as claimed in claim 5, further comprising:
   optically scanning the construction platform to capture the relative position after heattreatment of a component constructed on the construction platform.

8. The method as claimed in claim 5, further comprising:
   optically scanning the construction platform to capture the relative position after removal of the additively manufactured component from the construction platform.

9. The method as claimed in claim 5, further comprising:
   comparing an outcome of the optical scanning of the construction platform to a starting state of the construction platform with regard to the stress and/or deformation state.

10. The method as claimed in claim 1, further comprising:
    providing the construction platform with a code, a bar code, and/or a QR code.

11. The method as claimed in claim 1,
    wherein the optical scanning method is a laser scanning method.

12. The method as claimed in claim 11,
    wherein the laser scanning method comprises structured-light scanning of the construction platform and 3D form and measurement analysis and/or 3D analysis of computerbased data, using hardware and software.

13. The method as claimed in claim 1, further comprising:
    additive manufacturing of the component using the information relating to alignment of the construction platform in space.

* * * * *